June 15, 1965 J. H. WALLY, JR., ETAL 3,188,909
SUBJECT HOLDER UTILIZING CONTINUOUS GROOVE AND VACUUM
MEANS FOR USE WITH AN OVERHEAD CAMERA
Original Filed May 22, 1958
3 Sheets-Sheet 3
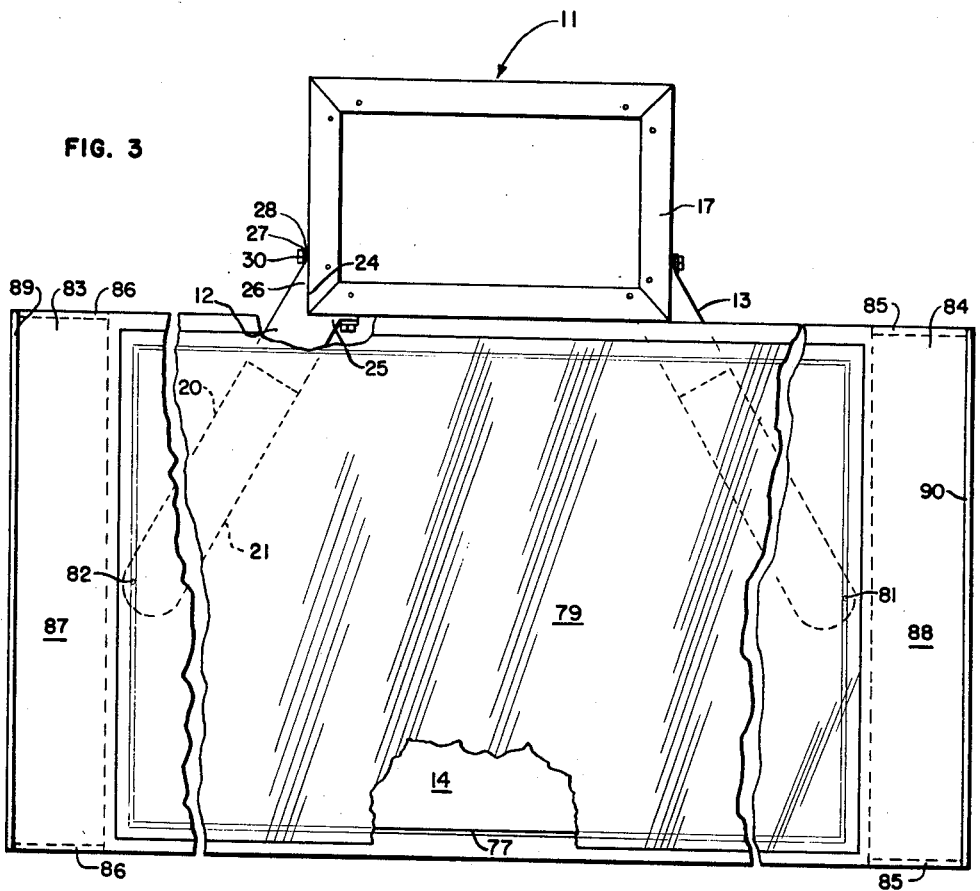
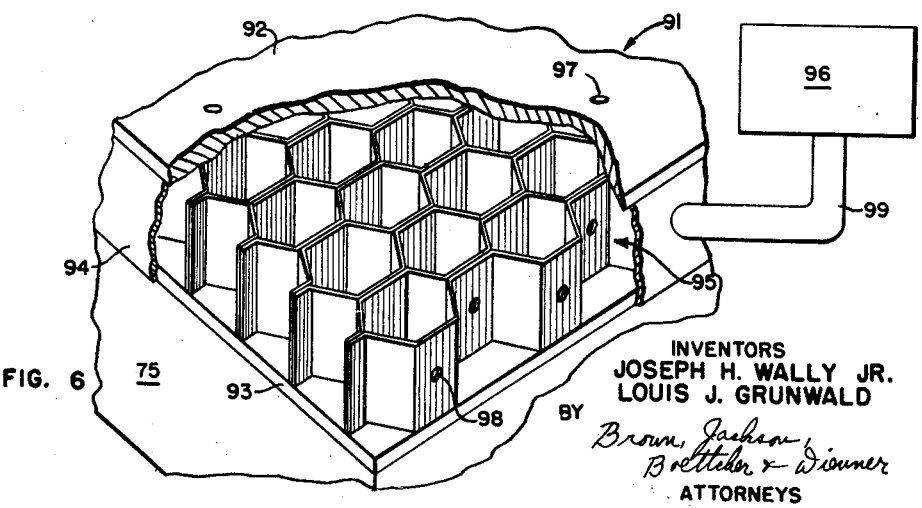
INVENTORS
JOSEPH H. WALLY JR.
LOUIS J. GRUNWALD
BY
ATTORNEYS

United States Patent Office 3,188,909
Patented June 15, 1965

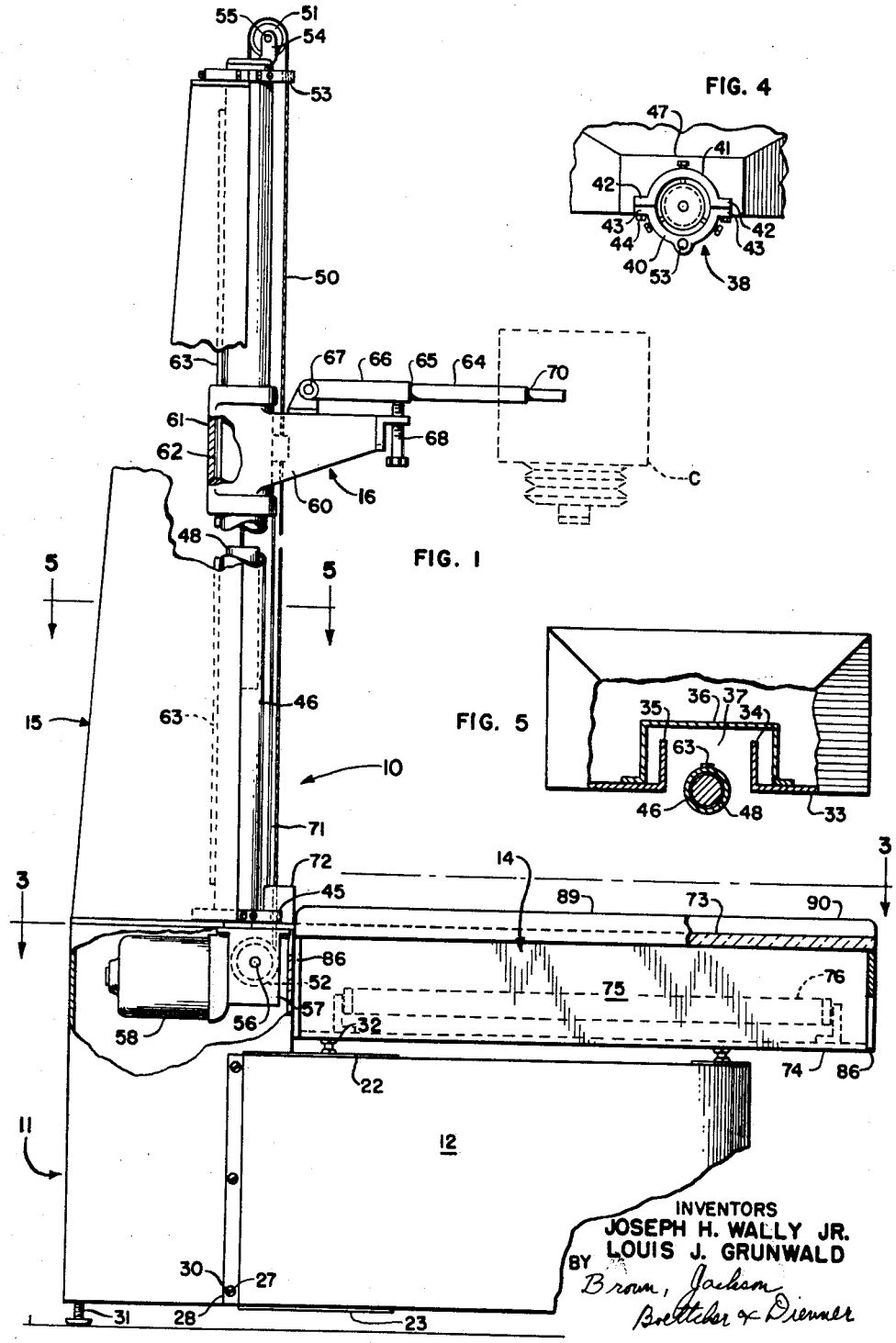

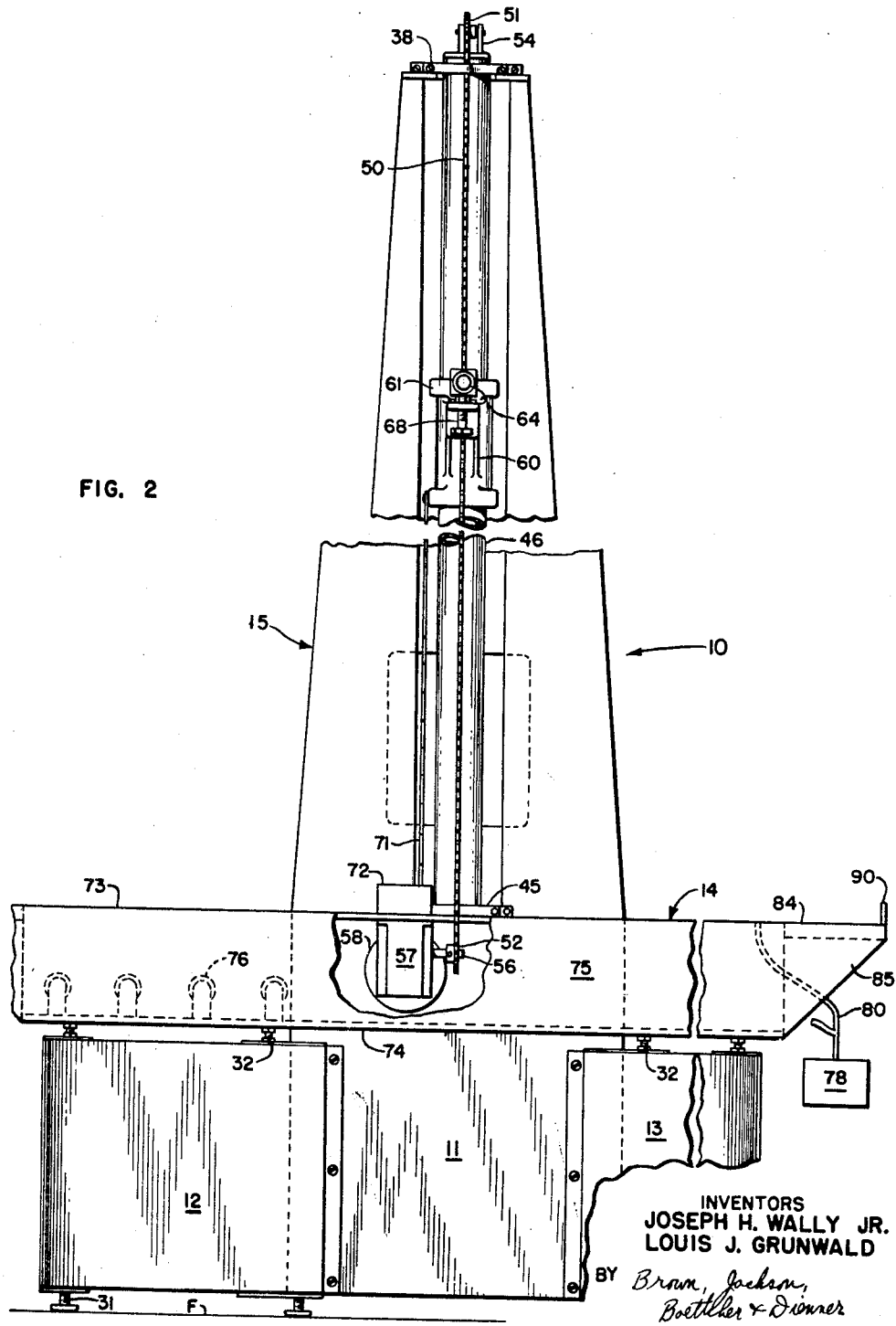

3,188,909
SUBJECT HOLDER UTILIZING CONTINUOUS GROOVE AND VACUUM MEANS FOR USE WITH AN OVERHEAD CAMERA
Joseph H. Wally, Jr., Shawnee Missions, and Louis J. Grunwald, Prairie Village, Kans., assignor to Western Blue Print Company, Kansas City, Mo., a corporation of Missouri
Original application May 22, 1958, Ser. No. 737,047, now Patent No. 3,062,093, dated Nov. 6, 1962. Divided and this application Jan. 23, 1962, Ser. No. 168,167
3 Claims. (Cl. 88—24)

This invention relates, in general, to photographic reproduction and in particular to a new and improved subject holder for a camera or projector.

The present application is a division of my copending application, Serial No. 737,047, filed May 22, 1958, now Patent No. 3,062,093 issued November 6, 1962.

Heretofore in the reproduction of drawings and the like by photography, the lack of sharpness in the negatives has been largely attributed to optical restrictions, film quality, etc., and research and development to achieve sharp negatives has been largely along these lines. It is generally known that good resolution is mainly dependent on four factors: lens of ample capacity for process work (flat field and good resolution power); a film having the quality to resolve a detail transmitted to it by the lens (fine grain); good developing chemicals for image definition (fine grain developer); and rigidity and immobility of the entire camera support and subject holder mechanism.

We have found that the last factor plays a more important part in producing a poor quality negative than originally thought and little consideration heretofore was given to the fact that without such rigidity and immobility, the lens, the film and the developing chemicals are rendered useless.

There are numerous mechanisms for supporting the camera and the subject relative thereto but such mechanisms are defective in that they do not accomplish the necessary rigidity and immobility.

Another defect in numerous mechanisms for supporting the camera and the subject holder relative thereto has been distortion caused by mis-alignment between the plane of the film in the camera, the lens and the subject holder itself. This alignment, necessary to achieve and maintain perfect or near-perfect right angularity and fixation along a single optical axis could have been achieved only with tie-rods, braces, guy wires or other supporting means, all of which would have detracted from the general appearance. The subject invention exceeds in capacity the functional abilities of all these, and looks attractive as well. It does so without complexity, with light weight, with a structure which is easily assembled and disassembled, easily packed, and, because it may be simply packed when disassembled, and easily transported.

Accordingly, in our copending parent application 737,047, a general object of our invention there claimed is a new and improved camera support and subject holder mechanism which is an improvement over prior art structures of similar type and which will achieve rigidity and immobility yet is light in weight and will aid in securing satisfactory negatives by micro-photography having good resolution qualities and lack of distortion.

We accomplished this general object by the provision of a base with angularly disposed wing-like pedestal legs upon which a subject holder rests and an elongated pyramidal shell with a tubular supporting column therewithin resting on the base. This tubular supporting column slidably receives a supporting bracket for a planetary camera and means are provided whereby the base and the legs, the legs and the subject holder, the column with its bracket and base, each may be individually adjusted with reference to a predetermined plane or level and to each other to provide parallel co-planar relationship between the film plane and the subject plane and perfect perpendicular relationship with these planes and the optical axis to accomplish good resolution and lack of distortion on the negative.

In connection with said invention in a combined support for a camera or projector and subject holder, we have also invented a new and improved subject holder made in the form of a shadow box and having a translucent top surface with means provided for utilizing vacuum so that the subject may be held flat against the flat surface of the holder as a further aid in avoiding distortion or non-parallel planar relationship of the subject with the film plane and it is to this invention that the present application is directed.

We have also provided, in a further embodiment of our invention, a new and improved subject holder made of structural honey-combed sandwich-like material as a means of obtaining flatness on the top surface thereof to aid in avoiding distortion and capable of being used where desirable on the top of our shadow-box type subject holder. In this honey-combed type subject holder, means are also provided for introducing suction thereinto so that the subject may be held flat against the top surface of the holder as a further aid in avoiding distortion or non-parallel planar relationship of the subject with the film plane.

In accordance with the above, a principal object of the present invention is to provide a new and improved subject holder for use in a camera or projector employed in micro-photography which will provide the aforesaid advantages.

A more specific object of our invention as claimed herein is a new and improved shadow-box type subject holder having a translucent top surface whereby back lighting of a subject may be provided and incorporating means for utilizing vacuum so that the subject holder may be held flat against the top surface of the holder.

Still another object of this invention is the provision for use with a camera mechanism for micro-photography of a new and improved subject holder which is light and flat and which will provide parallel co-planar relationship with the film plane of the camera.

Still another object of our invention is the provision of a new and improved subject holder in a camera supporting mechanism for micro-photography utilizing vacuum to retain the subject against a flat surface of the subject holder thereof to provide for extreme flatness and parallel relationship with the film holder.

Other objects and advantages of our present invention will be apparent from the following detailed description taken in conjunction with the drawings.

In the drawings:
FIG. 1 is a side view, partially broken away, showing to advantage a camera and subject holder supporting mechanism with one form of subject holder constructed according to the teachings of our present invention;
FIG. 2 is a front view thereof, partially broken away;
FIG. 3 is a view taken along lines 3—3 of FIG. 1 and looking in the direction of the arrows illustrating to advantage the top surface of the subject holder;
FIG. 4 is an enlarged, detailed, plan view illustrating to advantage one of the coupling means for adjusting the column;
FIG. 5 is a cross-sectional plan view taken along lines 5—5 of FIG. 1 showing to advantage the cross-section of the shell and supporting member; and
FIG. 6 is a fragmentary perspective view, partially broken away, showing to advantage the internal structure of the honey-comb type subject holder forming another embodiment of our invention.

Turning now to the drawings and particularly FIGS. 1, 2 and 3, there is illustrated in detail a camera base and column support indicated in its entirety as 10, which comprises a base, indicated in its entirety as 11, having a pair of wing-like pedestal legs 12 and 13, detachably affixed to the base and extending at an angle therefrom, and which adjustably support a shadow box type subject holder 14. A column, indicated in its entirety as 15, detachably supported on the top of base 11, substantially normal to the legs 12 and 13, supports a slidable camera head support 16 for a planetary camera C.

Base 11 is formed with four substantially parallel sides of relatively flat material, such as sheet steel or the like, rectangular in cross section (see FIG. 3), and having a plurality of inwardly extending upper flanges 17. Similar flanges (not shown) are on the bottom of the base. Wing-like legs 12 and 13 each are formed of relatively flat material, such as sheet steel or the like, with elongated parallel sides 20 and 21 partially closed at the top and at the bottom by sides 22 and 23 and curved at one end (see FIG. 3). Each leg is further provided with a right angular recess 24 from which extends a pair of flanges 25 and 26. Flanges 25 and 26 are suitably apertured as at 27 to complement similar apertures 28 in base 11 throughout their lengths to receive attaching means, such as the nut and bolt assemblies 30, to attachably fix the same to the base 11. Wing-like legs, in the embodiment shown, are angularly disposed with respect to the sides of the base 11 to form a support for the column 15 and for the shadow box type subject holder 14 representing the present invention.

In the camera or projector support shown, four adjusting means 31 of the conventional set screw type are provided, two on the bottom of the base and one on each of the wing-like legs 12 and 13, to provide suitable adjustment with the floor F. At the top of each wing-like leg 12 and 13, there is provided a pair of set screw adjusting means 32, which adjustably support the shadow box type subject holder 14. By suitably adjusting the set screws 31 and the set screws 32, horizontal adjustment of the subject holder 14 and vertical adjustment of the column 15 may be accomplished. If desired, an additional piece of metal or the like may be added under the various adjusting screws for strengthening purposes.

Column 15 comprises a hollow, four-sided shell 33, large at the bottom and narrow at the top, forming an oblique elongated pyramid of relatively flat material, such as sheet steel or the like, rectangular in overall cross-section with one side (facing subject holder 14) perpendicular to the floor F. The shell 33 is provided with a pair of flanges 34 and 35 turned inwardly to face a channel-like second piece 36 of relatively flat material of sheet steel or the like, U-shaped in cross-section, suitably affixed to the shell to form an enclosure 37 generally U-shaped in cross-section as shown in FIG. 5; flanges 34, 35 being added for strengthening purposes.

At the top of the shell 33, there is provided a substantially circular shaped split collar member, indicated in its entirety as 38, formed of the two U-shaped halves 40 and 41 each having a pair of radially outwardly extending flanges 42 and 43 which are suitably bored and complementarily threaded to receive attaching means, such as screws 44. Half 41 of collar member 38 is permanently affixed to the top of the shell 33 by any suitable means such as welding. A similar collar member, indicated in its entirety as 45, is also suitably and permanently affixed to the lower portion of the shell 33 by welding. Since collar member 45 is identical with collar member 38, no further description is necessary. A hollow tubular member 46 is held within the collar 38 by a plurality of set screws 47 disposed at an angle with each other to triangulate the tubular member 46 therewithin at the top of the column. Collar 45 has similar set screws to triangulate the tubular member 46 at the lower end thereof.

Tubular member 46, being hollow, conveniently receives a counter-weight 48 affixed to a continuous roller chain 50 to counterbalance the camera head support 16 affixed to the opposite ends of the continuous chain. Chain 50 is disposed about a pair of sprockets 51 and 52 and is freely movable within an aperture 53 in collar member 38; sprocket 51 being located at the top of the column 15 above the collar 38, sprocket 52 being located at the bottom of the column below the collar 45 which has an aperture similar to aperture 53. A suitable bracket 54 to rotatably support the sprocket 51 on shaft 55, is conveniently affixed to the top of the column and sprocket 52 is rotatably mounted on a shaft 56 forming part of a gear reduction unit 57 driven by electric motor 58. Rotation of the sprocket 52 by the motor will raise or lower the camera supporting head 16 to any convenient location relative to the column 15.

Camera support head 16 comprises triangularly shaped bracket 60 of a metal casting or the like having a vertical circular bore or hole 61 to slidably receive the tubular member 46 and is further provided with a vertical slot 62 opening into the bore 61 to receive a rib or keyway 63 attached to the rear of the tubular member column 46 by any suitable means. The slot 62 and rib 63 prevent rotatable horizontal movement of the bracket 60. A horizontally outwardly extending mounting bar means 64 is received in a horizontal bore 65 of an adjustable arm 66 hingedly mounted as at 67 to the top of bracket 60 to adjustably affix the bar 64 to the bracket 60. Suitable screw means 68 is provided to adjust the arm 66 and bar 64, and a shoulder 70 may be provided on the bar near the outer end thereof by reducing the diameter of the bar on which the camera is slidably received.

Means, such as a properly indexed self-returning tape 71 in box 72, may be provided at the top of the base 11 and connected with the supporting bracket 60, to indicate the height of the camera for focus calculations.

Turning now to the preferred embodiment of the invetion, a subject holder is shown adjustably supported on wing-like legs 12 and 13, hereinbefore described, comprising a table-like structure having a flat top side 73 and a flat bottom side 74, separated by four sides 75 to form a right-angular hollow parallelopiped. Top side 73, intended to be translucent, may be made of a sheet of thick frosted plate glass, or other translucent material, for the diffusion of background light from a plurality of fluorescent tubes 76 within the shadow box 14. The flat top side 73 of the shadow box type subject holder 14 is provided with a relatively thin, relatively shallow peripheral groove 77 formed near the margins of the top side and, in the embodiment shown, are interconnected to form a rectangle. Groove 77 is placed in communication with a vacuum pump 78 by flexible tubing or the like 80, connected at one end with the vacuum pump and the other end with apertures 81 and 82 formed in the top side 73. With this arrangement, it can be seen that by using a sheet of flexible material such as acetate sheet 79 which is of a size larger than the rectangle formed by groove 77, a drawing or the like, or light sensitive paper, as the case may be, may be positioned therebetween and the top side 73 of subject holder within the rectangle the groove defines and be held rigidly and flat against the top surface thereof by the vacuum that is created by the acetate and the peripheral groove 77. The acetate sheet 79 may be conveniently taped at one end of the subject holder 14, leaving three sides open so that the drawing may be easily inserted between the acetate sheet 79 and the top side 73, and suitable extensions 83 and 84 may be provided on the opposite ends of the shadow box subject holder, as illustrated in FIGS. 2 and 3. The extensions each comprise a pair of triangular supporting end plates 85 and 86 supporting a top plate 87 and 88. Furthermore, if desirable, retaining plates 89 and 90 may be provided at each end of these extensions to aid in centering the drawings, etc.

From the above arrangement, it can be seen that the drawing or the like, which is to be reproduced by the camera, may be front-lighted by an arrangement of suitable lights over the subject holder directed at the drawing and back-lighted by the arrangement of fluorescent lights 76 within the shadow box. This ability to back-light and front-light has been found very desirable in the photographic reproduction of drawings which are otherwise difficult to reproduce.

Turning now to FIG. 6 of the drawings, there is illustrated a honey-comb type subject holder, indicated in its entirety as 91, supported on the shadow box type holder 75 and comprising a relatively thin, table-top like structure having a flat top side 92 and a flat bottom side 93, separated by a plurality of relatively thin and narrow side walls 94 enclosing a plurality of honey-combed reinforcing ribs indicated in their entirety as 95. The internal structure of this honey-combed subject holder 91 is preferably air-tight throughout and, in one application of our invention, the top side 92 is in communication with a conventional suction type blower 96; communication being effected by a plurality of apertures 97 in the top side 92 is illustrated in FIG. 6 and apertures 98 in the honey-combed ribs to a relatively large flexible pipe 99. It is to be noted that the honey-comb structure rigidly supports the top of the honey-comb subject holder and prevents it from buckling or bending under suction and enables the subject holder to support its own weight whether vertically or horizontally. With this construction, a translucent acetate paper material may be used to hold a drawing or the like against the top side in a manner described in connection with the shadow box type subject holder 75 except that, with this arrangement, back-lighting of the drawing to be reproduced is impossible. However, this type of subject holder for certain applications may be useful and may be easily supported on top of the shadow box 75 or directly upon the legs 12 and 13 as desired. If supported on the shadow box type subject holder 14, then it is only necessary for the honey-comb box to be tilted vertically to use the back-lighting arrangement. Furthermore, the honey-comb type subject holder may itself be provided with retaining plates such as plates 89 and 90 of subject holder 14, if desired.

From the above description it will be apparent that all of the objects and advantages of the invention in a subject holder are obtainable in a convenient and entirely practicable manner. Also, it will be understood that the above description is of but a preferred form of the invention and many changes and modifications may be made to the embodiment described herein without departing from the spirit or scope of the invention which is comprehended solely by the appended claims which should be given a scope consistent with the prior art.

We claim:

1. A subject holder comprising a table-like structure having a flat topside on which to rest sheet material, at least a portion of said top side being of translucent material to permit back lighting of sheet material rested thereon, said top side having a narrow, relatively shallow, continuous peripheral groove located inwardly of the margins of said top side to define a rectangular form, a sheet of transparent flexible material to overlie sheet material positioned on said translucent surface and within the said rectangular form which the groove defines, said sheet of transparent flexible material being of a size to cover the sheet material and rectangular form defining groove, and means connecting said groove with a vacuum pump activatable to create a vacuum between said sheet and translucent surface to tightly draw and hold said sheet material therebeneath against said surface.

2. A subject holder comprising a table-like structure having a flat topside, a bottom side and four sides forming together a right-angular hollow parallelepiped, said top side including at least a central portion of translucent material, and having a narrow, relatively shallow, continuous peripheral groove formed near the margins of said top side which defines a rectangle, a sheet of transparent flexible material to overlie sheet material positioned on said translucent surface and within the said rectangle the groove defines, said sheet of transparent flexible material being of a size to cover the sheet material and rectangle-defining groove, means connecting said groove with a vacuum pump activatable to create a vacuum between said sheet and translucent surface to tightly draw and hold said sheet and sheet material therebeneath against said surface, and lighting means within said parallelepiped to backlight the sheet material.

3. A subject holder for use with an overhead camera comprising a table-like structure having a flat topside and containing illuminating means disposed below said top side for illuminating said top side from beneath, said top side including a centrally disposed work supporting translucent portion having a smooth uninterrupted planar surface on which to rest sheet material to be photographed from above and a narrow, relatively shallow continuous groove extending about and outside said work supporting portion, said work supporting portion accommodating diffused back lighting of sheet material when positioned thereon, and said groove being connected to an air evacuating device whereby sheet material rested on said work supporting portion may be conformed to the planar shape of its surface by use of a transparent flexible sheet member positioned thereover and so as to cover the work supporting portion and the groove which surrounds it.

References Cited by the Examiner

UNITED STATES PATENTS

| | | | |
|---|---|---|---|
| 1,478,828 | 12/23 | Jones | 95—76 |
| 1,535,041 | 4/25 | Ruhmann | 88—24 |
| 1,675,492 | 7/28 | Huebner | 95—76 |
| 1,742,372 | 1/30 | Taylor | 95—76 X |
| 1,813,690 | 7/31 | Weisker | 95—73 |
| 2,317,348 | 4/43 | Wekeman | 95—76 X |
| 2,720,146 | 10/55 | Mears | 95—73 |
| 2,836,099 | 5/58 | Weishaupt | 88—24 |
| 2,895,706 | 7/59 | Blatherwick | 88—24 |
| 2,941,461 | 6/60 | Ludwig | 88—24 |
| 3,104,585 | 9/63 | Wally | 95—76 X |

LEO SMILOW, *Primary Examiner.*

EMIL G. ANDERSON, LEYLAND M. MARTIN,
*Examiners.*